United States Patent
Higgins et al.

(10) Patent No.: US 12,061,128 B2
(45) Date of Patent: Aug. 13, 2024

(54) TORQUE LOADING IN COMPONENT STACK ASSEMBLY

(71) Applicant: RTX Corporation, Farmington, CT (US)

(72) Inventors: Austin J. Higgins, Orleans, MA (US); Ernest Boratgis, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 35 days.

(21) Appl. No.: 17/370,437

(22) Filed: Jul. 8, 2021

(65) Prior Publication Data
US 2023/0008290 A1    Jan. 12, 2023

(51) Int. Cl.
| | | |
|---|---|---|
| F01D 25/16 | (2006.01) | |
| G01L 3/00 | (2006.01) | |
| G01L 3/10 | (2006.01) | |
| G01M 99/00 | (2011.01) | |

(52) U.S. Cl.
CPC .............. *G01L 3/101* (2013.01); *F01D 25/16* (2013.01); *G01L 3/00* (2013.01); *G01M 99/008* (2013.01); *F05D 2230/60* (2013.01); *F05D 2240/50* (2013.01); *F05D 2260/81* (2013.01)

(58) Field of Classification Search
CPC ........... G01L 3/101; G01L 3/00; F01D 25/16; G01M 99/008; F05D 2230/60; F05D 2240/50; F05D 2260/81
See application file for complete search history.

(56) References Cited

U.S. PATENT DOCUMENTS

| | | | | |
|---|---|---|---|---|
| 4,845,998 A | * | 7/1989 | DeMartelaere | ......... B25B 23/14 73/761 |
| 5,224,403 A | * | 7/1993 | Rueb | ................... B25B 23/1427 81/477 |
| 5,760,289 A | | 6/1998 | Skottegard | |
| 6,144,891 A | * | 11/2000 | Murakami | .............. B23P 19/10 81/467 |

(Continued)

FOREIGN PATENT DOCUMENTS

| | | |
|---|---|---|
| EP | 0914910 A1 | 5/1999 |
| GB | 2434621 A | 8/2007 |

OTHER PUBLICATIONS

Extended European Search Report for Application No. 22183969.9-1004; Date of Mailing: Dec. 23, 2022; 7 pages.
EP NOA Issued Jan. 19, 2024 in U421777EP, 28 pages.

*Primary Examiner* — Michael J Dalbo
*Assistant Examiner* — Denise R Karavias
(74) *Attorney, Agent, or Firm* — CANTOR COLBURN LLP

(57) ABSTRACT

According to an aspect, a system includes a memory system configured to store a plurality of instructions and a processing system. The processing system is configured to communicate with the memory system and execute the instructions that result in determining an initial torque applied to a component stack, determining an assembly torque and an angle of turn applied to the component stack after the initial torque is applied, and determining a friction value associated with the component stack. Execution of the instructions further result in determining a stack load of the component stack based on the friction value, the assembly torque, and the angle of turn, and outputting an indicator of the stack load.

16 Claims, 4 Drawing Sheets

(56) References Cited

U.S. PATENT DOCUMENTS

| | | |
|---|---|---|
| 7,912,587 B2 | 3/2011 | Walters et al. |
| 10,174,628 B2 | 1/2019 | Humhauser et al. |
| 10,337,330 B2 | 7/2019 | Conduit et al. |
| 10,472,979 B2 | 11/2019 | Montgomery et al. |
| 2006/0013693 A1* | 1/2006 | Meacham ............... F01D 5/066 416/244 R |
| 2011/0223026 A1* | 9/2011 | Benjamin ............... F01D 5/066 416/198 A |
| 2013/0047799 A1* | 2/2013 | Gareis ................. B25B 23/1425 81/467 |
| 2017/0145859 A1* | 5/2017 | Mariano ................. F01D 5/026 |
| 2017/0266792 A1 | 9/2017 | Rode et al. |
| 2019/0022804 A1* | 1/2019 | Muldoon ............. F01D 25/125 |
| 2019/0368379 A1* | 12/2019 | Muldoon ................ F01D 5/066 |

\* cited by examiner

TORQUE LOADING IN COMPONENT STACK ASSEMBLY

BACKGROUND

Exemplary embodiments of the present disclosure pertain to the art of apparatus assembly and, more particularly, to friction correcting of a torque loaded component stack.

During assembly of complex mechanical systems, such as a gas turbine engine, multiple components are arranged in one or more stacks. For example, components can be arranged on a shaft with an interference fit and be preloaded during assembly with a targeted torque value. The application of torque to the component stack during assembly can be subject to a wide range of variability based on a combination of intrinsic properties of the components as manufactured and characteristics of the components during assembly. The stack load must be sufficient to keep components of the stack in place, but too high of a load may cause components to prematurely fail or sustain damage. Designing components in a stack to meet a large stack load range may result in oversized components that add weight to the overall system, which in the case of a gas turbine engine, could result in increased fuel consumption.

BRIEF DESCRIPTION

Disclosed is a system that includes a memory system configured to store a plurality of instructions and a processing system. The processing system is configured to communicate with the memory system and execute the instructions that result in determining an initial torque applied to a component stack, determining an assembly torque and an angle of turn applied to the component stack after the initial torque is applied, and determining a friction value associated with the component stack. Execution of the instructions further result in determining a stack load of the component stack based on the friction value, the assembly torque, and the angle of turn, and outputting an indicator of the stack load.

In addition to one or more of the features described above or below, or as an alternative to any of the foregoing embodiments, the friction value can include a friction torque ratio based on the initial torque, the assembly torque, and the angle of turn.

In addition to one or more of the features described above or below, or as an alternative to any of the foregoing embodiments, the friction torque ratio can relate a difference between the assembly torque and the initial torque to the angle of turn as scaled by a stiffness of the component stack.

In addition to one or more of the features described above or below, or as an alternative to any of the foregoing embodiments, the friction torque ratio can be scaled based on a number of threads per unit distance.

In addition to one or more of the features described above or below, or as an alternative to any of the foregoing embodiments, the component stack can be a bearing stack of a gas turbine engine.

In addition to one or more of the features described above or below, or as an alternative to any of the foregoing embodiments, the stack load can be determined between a stack end of the component stack and a stack nut.

In addition to one or more of the features described above or below, or as an alternative to any of the foregoing embodiments, the indicator of the stack load can be output with respect to target value.

In addition to one or more of the features described above or below, or as an alternative to any of the foregoing embodiments, the memory system and the processing system can be integrated with a torque wrench.

In addition to one or more of the features described above or below, or as an alternative to any of the foregoing embodiments, the memory system and the processing system can be integrated in an assembly support system.

In addition to one or more of the features described above or below, or as an alternative to any of the foregoing embodiments, the memory system and the processing system can be distributed between a torque wrench and an assembly support system.

Also disclosed is a method that includes determining, by a processing system, an initial torque applied to a component stack. The method also includes determining, by the processing system, an assembly torque and an angle of turn applied to the component stack after the initial torque is applied. The method further includes determining, by the processing system, a friction value associated with the component stack and determining a stack load of the component stack based on the friction value, the assembly torque, and the angle of turn. The method additionally includes outputting, by the processing system, an indicator of the stack load.

In addition to one or more of the features described above or below, or as an alternative to any of the foregoing embodiments, the processing system can be integrated in or distributed between a torque wrench and an assembly support system.

Also disclosed is a method that includes calibrating a torque wrench based on thread and stiffness information associated with a component stack prior to assembly. An initial torque is applied to a stack nut of the component stack to place a plurality of components of the component stack in contact between a stack end and the stack nut. An assembly torque is applied to the stack nut using the torque wrench until a calibrated force display indicates that a load specification has been met.

In addition to one or more of the features described above or below, or as an alternative to any of the foregoing embodiments, the calibrated force display can be integrated with the torque wrench, and the load specification can be compared to a stack load that is determined by a processing system based on monitoring the initial torque, the assembly torque, and a turn angle applied to the stack nut.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
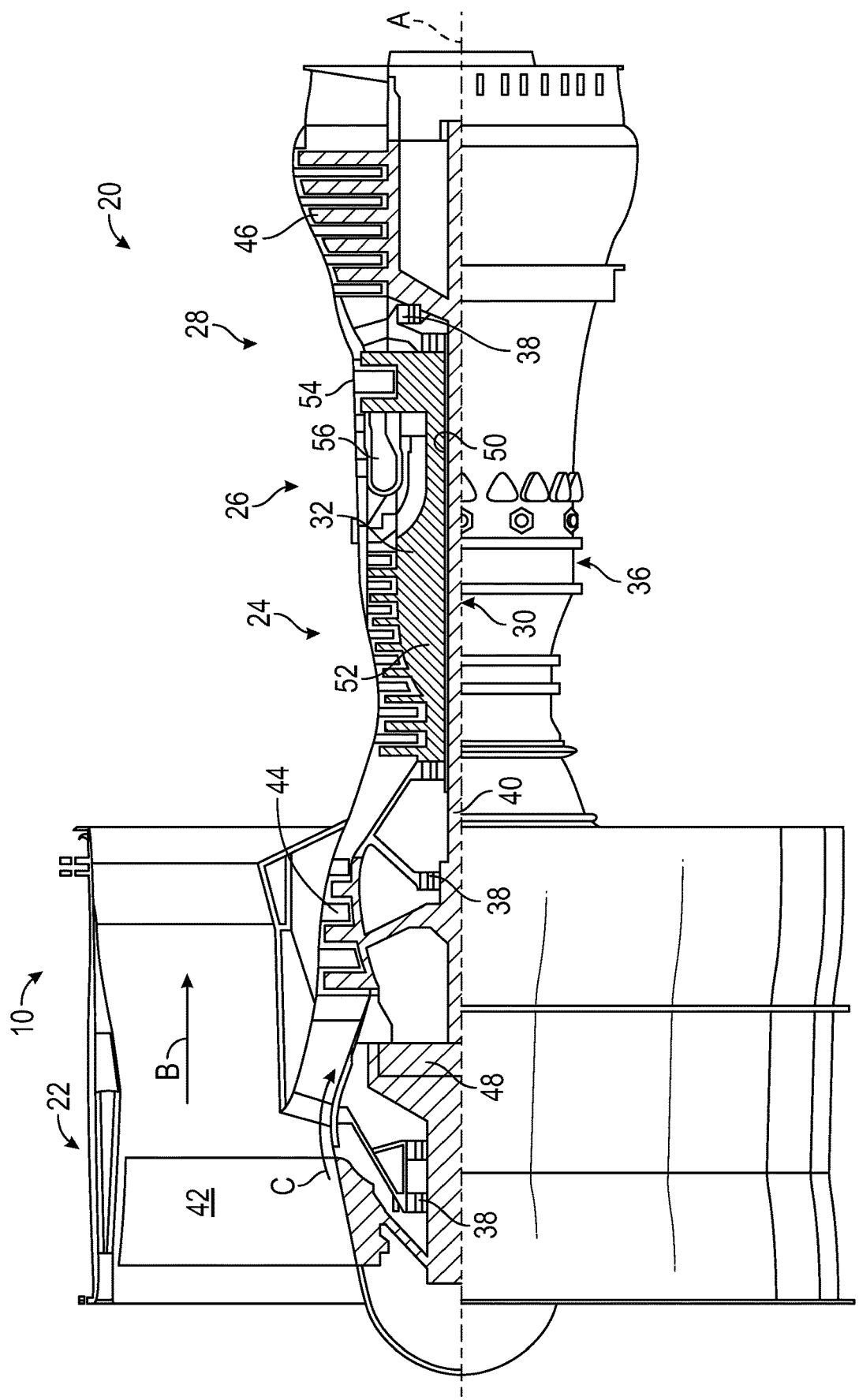
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
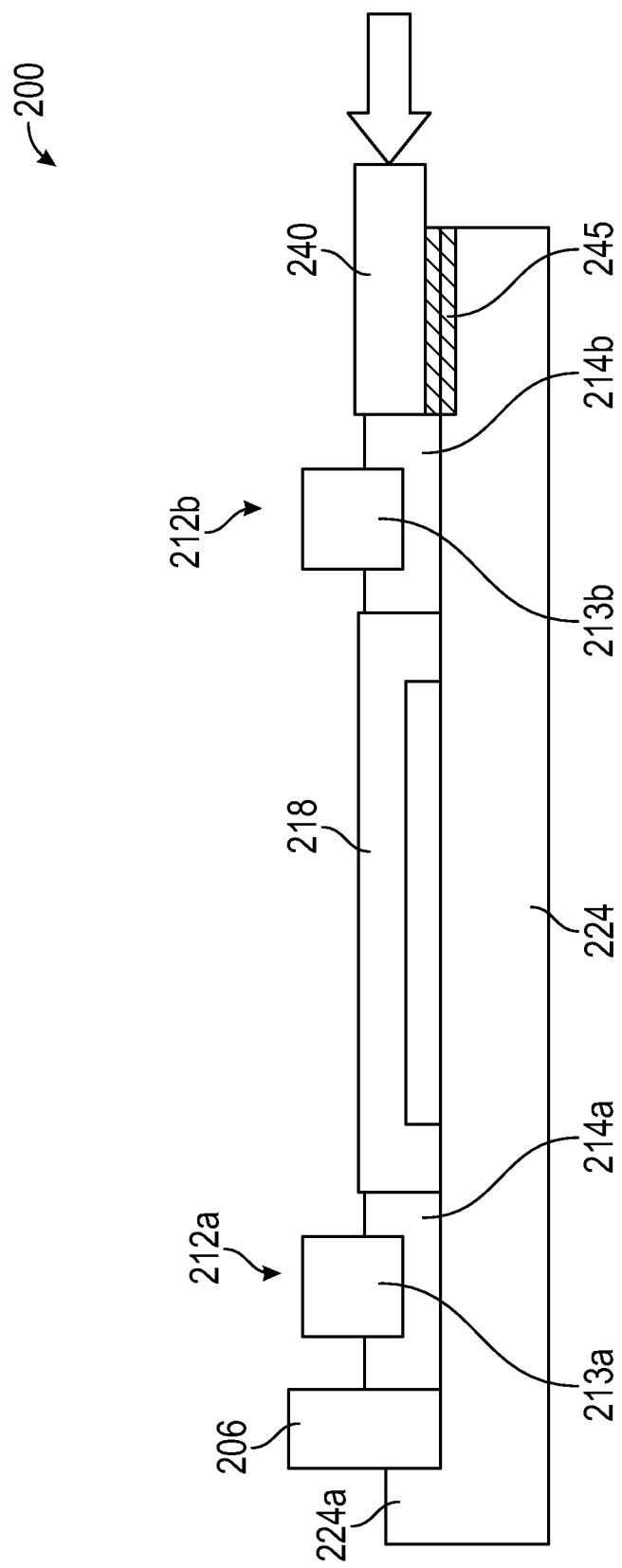
FIG. 2 is a block diagram of a component stack to which torque is applied during assembly, in accordance with an embodiment of the disclosure.

FIG. 2 depicts an example of a component stack 200 that can be integrated in an apparatus, such as the gas turbine engine 20 of FIG. 1. For instance, the component stack 200 can be part of the bearing systems 38 of FIG. 1, such as a bearing stack. In the example of FIG. 2, the component stack 200 includes a seal 206, a first bearing 212a, a spacer 218, and a second bearing 212b arranged relative to (e.g., radially outward from) a shaft 224. The first bearing 212a includes a first roller/rolling element 213a and a first race 214a, and the second bearing 212b includes a second roller/rolling element 213b and a second race 214b.

During assembly, the components 206-218 can be installed on the shaft 224 in the order mentioned above (e.g., left-to-right in FIG. 2). For example, the seal 206 is installed first, then the first bearing 212a, then the spacer 218, then the second bearing 212b. The arrangement/positioning of components (e.g., the components 206-218) adjacent to one another about a shaft (e.g., the shaft 224) may be referred to as a "stack" herein. A stack end 224a, which can be integrally formed with shaft 224, provides a lip/shoulder for applying a torque to the components 206-218 arranged on the shaft 224 relative to a stack nut 240. The stack end 224a can act as a bolt head. The stack nut 240 can be rotated on a threaded interface 245 to apply a load torque to ensure that the components 206-218 remain properly seated and gaps do not form between the components 206-218 in the component stack 200. While FIG. 2 depicts one example of a component stack, various arrangements of components are contemplated, such as seals, spacers, oil scoops, etc. Further, other component stack configurations may be any type of bolted joint with targeted torque requirements, such as oil fittings, bolted flanges, and the like.

Figure 3:
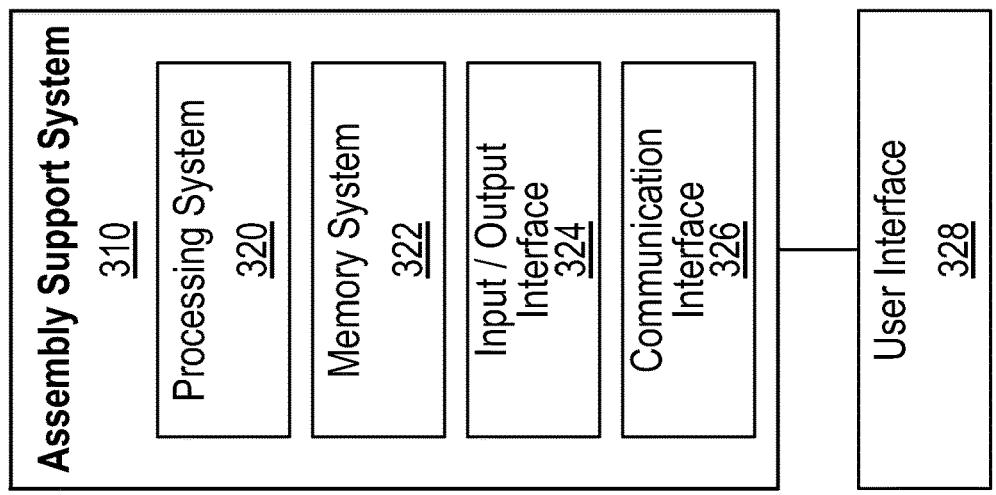
FIG. 3 is a block diagram of a system, in accordance with an embodiment of the disclosure.
Figure 3:
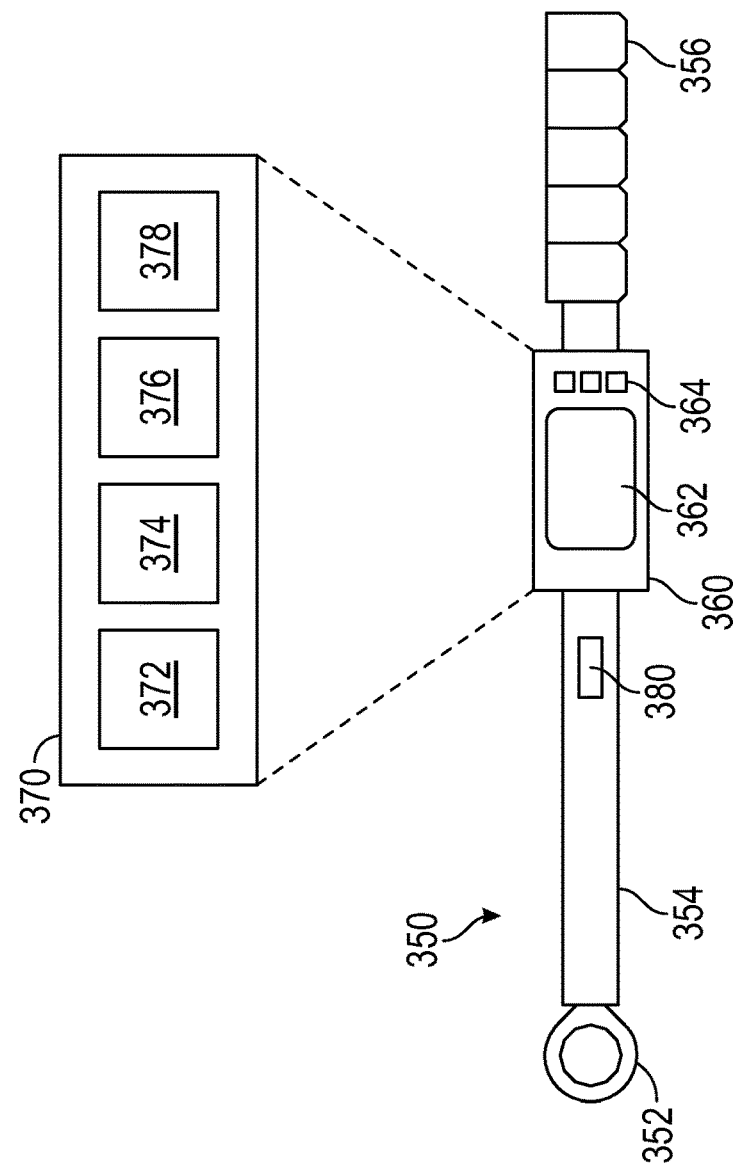

FIG. 3 is a block diagram of a system 300 that can include an assembly support system 310 and a torque wrench 350. The assembly support system 310 can include a processing system 320, a memory system 322, an input/output interface 324, and a communication interface 326. The processing system 320 can include any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 322 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form. The input/output interface 324 can process data input through a user interface 328 and output data to the user interface 328. For example, the user interface 328 can include a keyboard, a mouse, a display, a touchscreen, and/or input/output devices. The communication interface 326 can establish communication with various systems and/or devices through wired, wireless, and/or fiber optic connections.

In embodiments, the torque wrench 350 includes a tool head 352, a wrench body 354, and a handle 356. The torque wrench 350 can be implemented as a digital torque wrench with a user interface 360 having a display 362 and inputs 364. The user interface 360 can be coupled to a controller 370 disposed on, remotely connected to, or incorporated in the torque wrench 350. The controller 370 can include a processing system 372, a memory system 374, and an input/output interface 376. The controller 370 can also include a communication interface 378 to communicate with other devices, such as the assembly support system 310 through communication interface 326.

The processing system 372 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 374 can store data and instructions that are executed by the processing system 372. In embodiments, the memory system 374 may include random access memory (RAM), read only memory (ROM), or other electronic, optical, magnetic, or any other computer readable medium onto which is stored data and algorithms in a non-transitory form. The input/output interface 376 is configured to output information on the display 362 and receive input from inputs 364. Further, the input/output interface 376 can collect sensor data from the one or more sensors 380. The sensors 380 can detect torque (e.g., using one or more torque sensing elements) and angle of turn (e.g., using one or more angle sensing elements) status of the tool head 352.

The tool head 352 can be sized to engage with the stack nut 240 of FIG. 2 and apply a torque to the stack nut 240. A user, such as a mechanic, can use the torque wrench 350 to apply torque to a component stack, such as the component stack 200 of FIG. 2. In some embodiments, the torque wrench 350 is used in conjunction with the assembly support system 310 to determine a stack load to be applied to the component stack 200 and monitor progress as the torque wrench 350 is used to apply torque to the stack nut 240 during assembly of the component stack 200.

Figure 4:
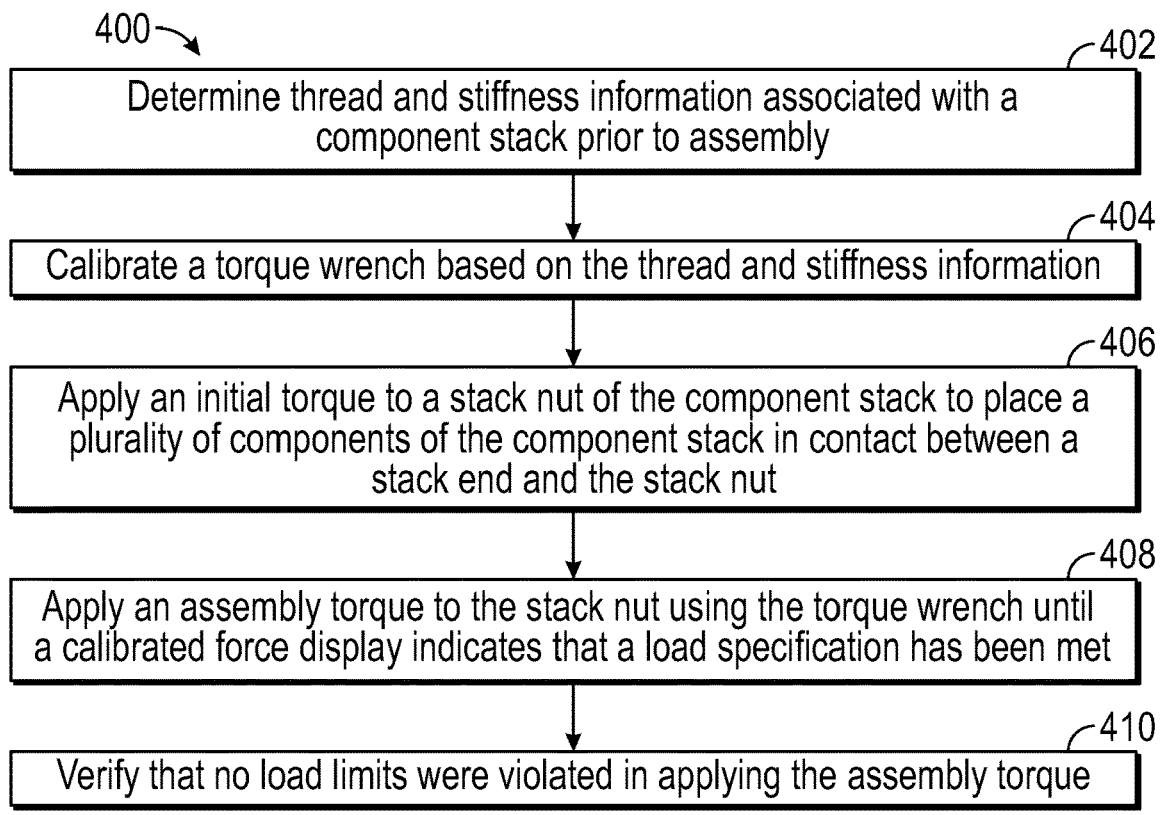
FIG. 4 is a flow chart illustrating a method, in accordance with an embodiment of the disclosure.

Referring now to FIG. 4 with continued reference to FIGS. 1-3, FIG. 4 is a flow chart illustrating a method 400 in accordance with an embodiment. The method 400 may be performed, for example, by a user working with the assembly support system 310 and/or the torque wrench 350 of FIG. 3.

At block 402, thread and stiffness information associated with a component stack is determined prior to assembly. For example, a design of the component stack 200 can be initially created using modeling and design tools to establish dimensions, materials, thread density, etc. A finite element analysis can be performed on the design to analyze an initial approximate preload to determine component tightening and loosening effects experienced in the component stack 200 during operation. Operating effects and minimum load requirements can used to define a target stack preload for assembly, with a set tolerance range added to account for tool accuracy/precision. The finite element analysis can also be used to determine stiffness values, such as axial stiffness of one or more joints. Thread and stiffness information can be stored in computer memory, such as the memory system 322. The analysis may be performed by software instructions executed by the assembly support system 310 or another system (not depicted). When analysis and computations are performed by another computer system, the results of the analysis and computations can be transmitted to the assembly support system 310 and/or the torque wrench 350.

At block 404, the torque wrench 350 is calibrated based on the thread and stiffness information associated with the component stack 200 prior to assembly. The information can be manually input into the torque wrench 350 by a mechanic through user interface 360 or transferred in through the communication interface 378.

At block 406, the mechanic can install the stack nut 240 on the shaft 224, engaging the threaded interface 245, and apply an initial torque to the stack nut 240 of the component stack 200 to place components 206-218 of the component stack 200 in contact between a stack end 224a and the stack nut 240. The initial torque ensures that gaps are closed between the components 206-218.

At block 408, the mechanic can apply an assembly torque to the stack nut 240 using the torque wrench 350 until a calibrated force display (e.g., on display 362 integrated with the torque wrench 350) indicates that a load specification has been met. The load specification can be defined based on previous analysis, such as that described with respect to block 402. A stack load can be determined in part by either processing system 320, 372 or a combination thereof for comparison with the load specification. The stack load can be based on monitoring the initial torque, the assembly torque, and a turn angle applied to the stack nut 240, as further described with respect to FIG. 5.

At block 410, verification can be performed to ensure that no load limits were violated in applying the assembly torque. For example, the torque wrench 350 and/or the assembly support system 310 can use internal limits and/or flags that are set and automatically checked during installation to prevent assembly abnormalities from entering into the fielded fleet. For instance, if an applied torque exceeds a maximum limit during installation but the torque is then lowered to be within range, a record of the over-torque condition can be captured and reported.

While the above description has described the flow process of FIG. 4 in a particular order, it should be appreciated that unless otherwise specifically required in the attached claims that the ordering of the steps may be varied.

In embodiments, calculating friction during a stack assembly procedure can reduce preload variability. Three assembly variables in stack preloading include initial torque, angle of turn, and friction. The initial torque ensures that stack components are properly seated. The angle of turn is an applied rotation angle for a more controlled stack load. Friction can be an unknown variable that determines load from the initial torque. Calculating friction during the assembly process can allow for real-time feedback about the stack load to a mechanic or monitoring system. By recording an angle of turn and torque data detected by the torque wrench 350, friction can be solved using, for example, equation (1).

$$K = TD * 360 \frac{T_f - T_i}{\theta K_s}$$ Equation (1)

Where K is friction (also referred to as friction torque ratio); TD is number of threads per unit distance (e.g., threads-per-inch); $T_f$ is current torque; $T_i$ is initial torque; θ is angle of turn in degrees; and $K_s$ is stiffness.

Figure 5:
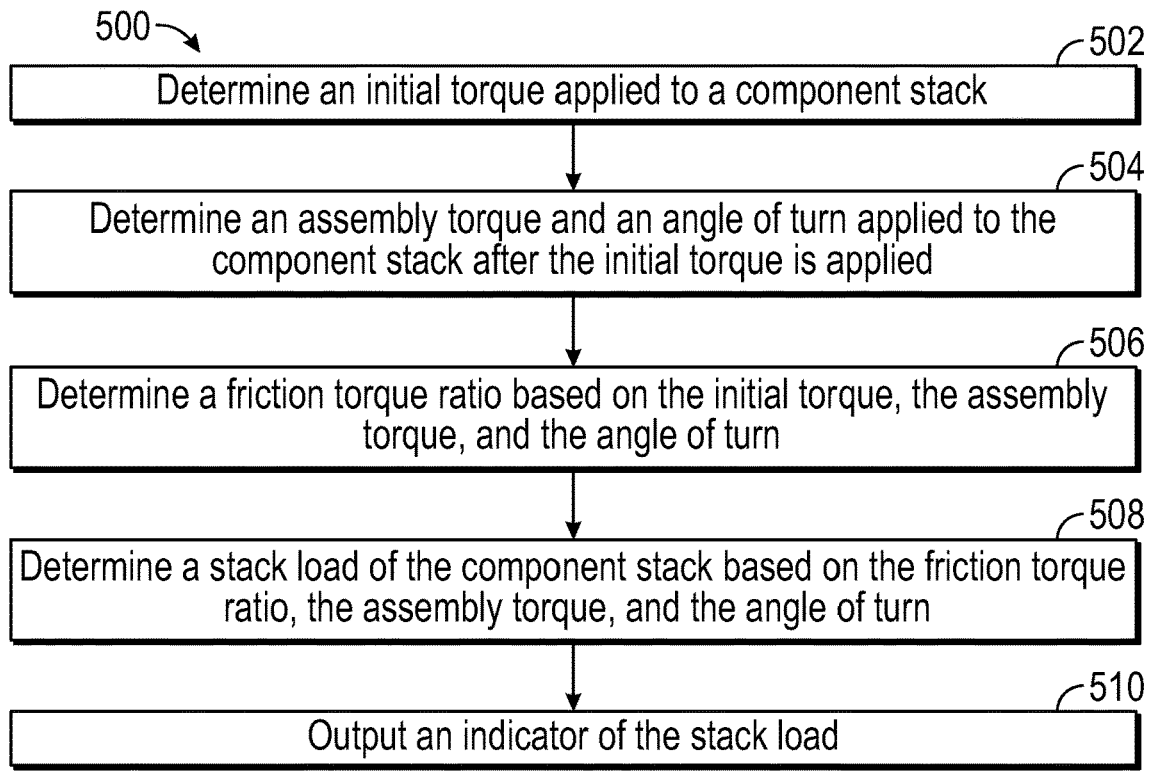
FIG. 5 is a flow chart illustrating a method, in accordance with an embodiment of the disclosure.

Based on equation (1), the stack load can be computed using, for example, equation (2) and as further described with respect to FIG. 5.

$$F(\theta, T) = \frac{\theta K_s}{TD * 360} \left( \frac{T}{T - T_i} \right)$$ Equation (2)

Where F is stack load force; θ is angle of turn in degrees; T is current torque; $K_s$ is stiffness; TD is number of threads per unit distance; and $T_i$ is initial torque.

Referring now to FIG. 5 with continued reference to FIGS. 1-4, FIG. 5 is a flow chart illustrating a method 500 in accordance with an embodiment. The method 500 may be performed, for example, using the assembly support system 310 and/or the torque wrench 350 of FIG. 3. The term "processing system" used with respect to FIG. 5 can indicate either processing system 320, 372 or a combination thereof (e.g., processing distributed between torque wrench 350 and assembly support system 310).

At block 502, a processing system can be determined an initial torque applied to component stack 200, for example, by a user engaging the torque wrench 350 with the stack nut 240 on the component stack 200. Torque may be determined by monitoring a torque sensor of the sensors 380.

At block 504, the processing system can determine an assembly torque and an angle of turn applied to the component stack 200 by the torque wrench 350 after the initial torque is applied.

At block 506, the processing system can determine a friction value associated with the component stack 200. The friction value can be a friction torque ratio based on the initial torque, the assembly torque, and the angle of turn. The friction torque ratio can relate a difference between the assembly torque and the initial torque to the angle of turn as scaled by a stiffness of the component stack 200. The friction torque ratio can be scaled based on a number of threads per unit distance.

At block 508, the processing system can determine a stack load of the component stack 200 based on the friction value, the assembly torque, and the angle of turn. The stack load can be determined between a stack end 224a of the component stack 200 and a stack nut 240.

At block 510, the processing system can output an indicator of the stack load. The indicator of the stack load can be output with respect to target value. The indicator may be output on display 362 and/or user interface 328. The indicator can be set based on a stack load target or a target torque. For example, a user can visually compare the results to a target value or an alternate form of alert can be used, such as a light, audio output, haptic feedback, etc. upon meeting the target.

While the above description has described the flow process of FIG. 5 in a particular order, it should be appreciated that unless otherwise specifically required in the attached claims that the ordering of the steps may be varied.

Technical effects can include reducing the variability in torque preloading to allow for leaner designs and better control over variability when designing and installing hardware. Additionally, in the case where the least controllable input, friction, is found to be outside of an assumed range, the assembly processes disclosed herein can detect and correct for such a condition. With the ability to calculate more assembly parameters on-the-fly, limits can be introduced to prevent unintended installation or over-torque of components.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a memory system configured to store a plurality of instructions; and
   a processing system configured to communicate with the memory system and execute the instructions that result in:
   determining an initial torque applied to a component stack, the component stack comprising a plurality of components arranged on a shaft between a stack end integrally formed with the shaft and a stack nut, wherein the initial torque comprises a load torque that closes gaps between the components;
   determining an assembly torque and an angle of turn applied to the component stack after the initial torque is applied;
   determining a friction value associated with the component stack, wherein the friction value comprises a friction torque ratio based on the initial torque, the assembly torque, and the angle of turn;
   determining a stack load of the component stack based on the friction value, the assembly torque, and the angle of turn as a first ratio of the angle of turn relative to a full turn and a stiffness of the component stack to a number of threads per unit distance, and a second ratio of the assembly torque to a difference between the assembly torque and the initial torque, wherein the stack load is determined between the stack end of the component stack and the stack nut, and the first ratio is multiplied by the second ratio; and outputting an indicator of the stack load.

2. The system of claim 1, wherein the friction torque ratio relates the difference between the assembly torque and the initial torque to the angle of turn as scaled by the stiffness of the component stack.

3. The system of claim 2, wherein the friction torque ratio is scaled based on the number of threads per unit distance.

4. The system of claim 1, wherein the component stack is a bearing stack of a gas turbine engine.

5. The system of claim 1, wherein the indicator of the stack load is output with respect to target value.

6. The system of claim 1, wherein the memory system and the processing system are integrated with a torque wrench.

7. The system of claim 1, wherein the memory system and the processing system are integrated in an assembly support system.

8. The system of claim 1, wherein the memory system and the processing system are distributed between a torque wrench and an assembly support system.

9. A method comprising:
determining, by a processing system, an initial torque applied to a component stack, the component stack comprising a plurality of components arranged on a shaft between a stack end integrally formed with the shaft and a stack nut, wherein the initial torque comprises a load torque that closes gaps between the components;
determining, by the processing system, an assembly torque and an angle of turn applied to the component stack after the initial torque is applied;
determining, by the processing system, a friction value associated with the component stack, wherein the friction value comprises a friction torque ratio based on the initial torque, the assembly torque, and the angle of turn;
determining, by the processing system, a stack load of the component stack based on the friction value, the assembly torque, and the angle of turn as a first ratio of the angle of turn relative to a full turn and a stiffness of the component stack to a number of threads per unit distance, and a second ratio of the assembly torque to a difference between the assembly torque and the initial torque, wherein the stack load is determined between the stack end of the component stack and the stack nut, and the first ratio is multiplied by the second ratio; and
outputting, by the processing system, an indicator of the stack load.

10. The method of claim 9, wherein the friction torque ratio relates the difference between the assembly torque and the initial torque to the angle of turn as scaled by the stiffness of the component stack.

11. The method of claim 10, wherein the friction torque ratio is scaled based on the number of threads per unit distance.

12. The method of claim 9, wherein the component stack is a bearing stack of a gas turbine engine.

13. The method of claim 9, wherein the indicator of the stack load is output with respect to target value.

14. The method of claim 9, wherein the processing system is integrated in or distributed between a torque wrench and an assembly support system.

15. A method comprising:
calibrating a torque wrench based on thread and stiffness information associated with a component stack prior to assembly;
applying an initial torque to a stack nut of the component stack to place a plurality of components of the component stack in contact between a stack end and the stack nut and close gaps between the components, wherein the stack end is integrally formed with a shaft and the components are arranged on the shaft; and
applying an assembly torque to the stack nut using the torque wrench until a calibrated force display indicates that a load specification has been met based on a comparison of a stack load of the component stack determined between the stack end of the component stack and the stack nut, wherein the load specification is compared to the stack load that is determined by a processing system based on monitoring the initial torque, the assembly torque, and a turn angle applied to the stack nut as a first ratio of the angle of turn relative to a full turn and a stiffness of the component stack to a number of threads per unit distance and a second ratio of the assembly torque to a difference between the assembly torque and the initial torque, wherein the first ratio is multiplied by the second ratio.

16. The method of claim 15, wherein the calibrated force display is integrated with the torque wrench.

* * * * *